Jan. 12, 1954
R. N. JANEWAY ET AL
2,665,776
BRAKE RIGGING SUSPENSION
Filed Nov. 13, 1948
3 Sheets—Sheet 3
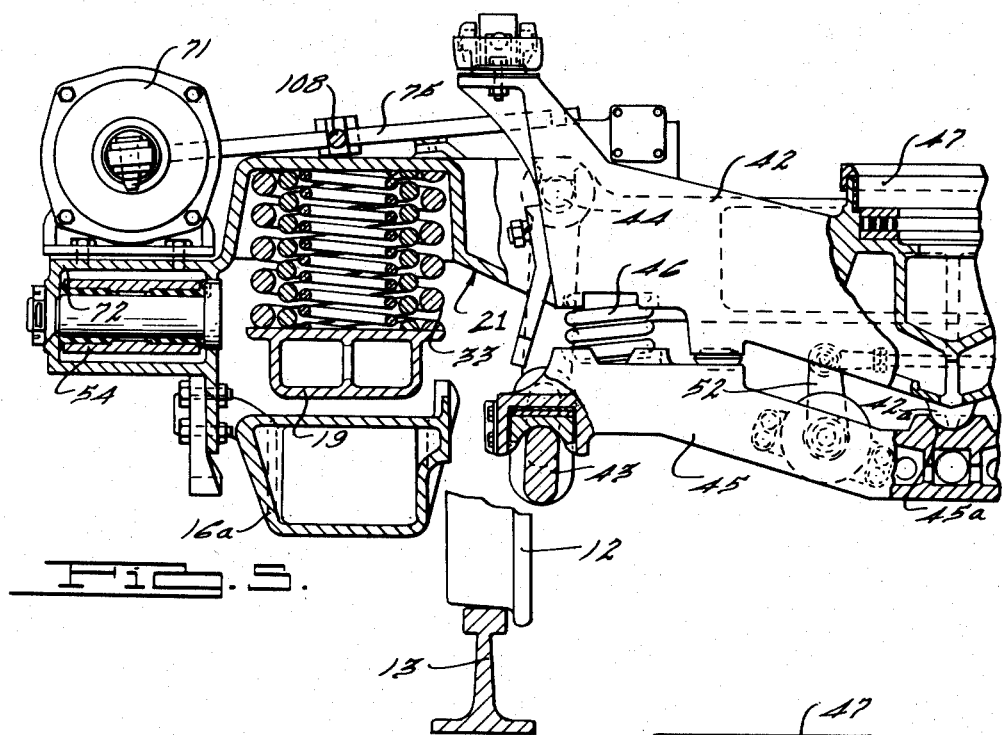
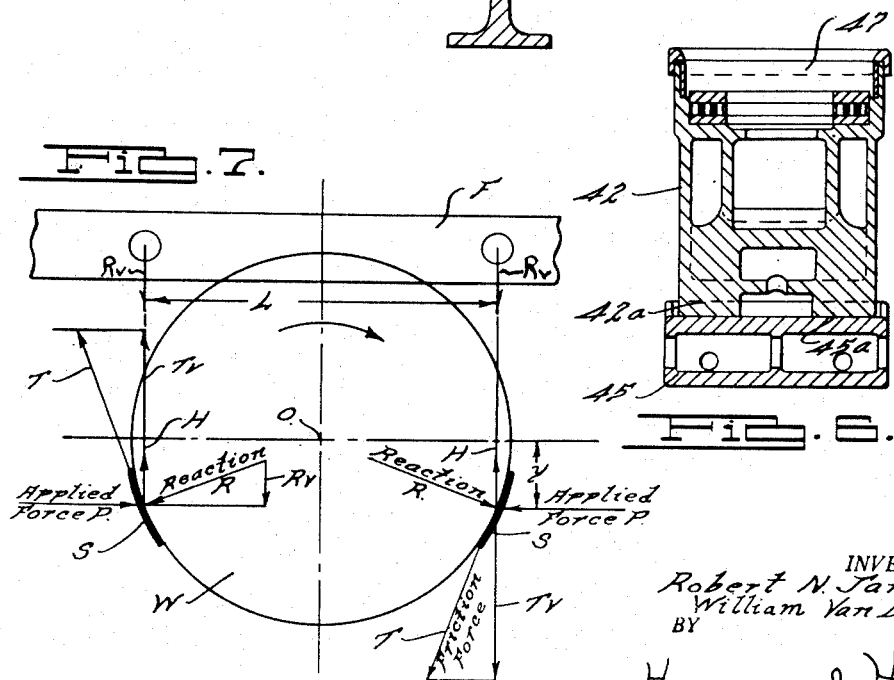
INVENTORS.
Robert N. Janeway,
William Van Der Sluys
BY
Harness and Harris
ATTORNEYS.

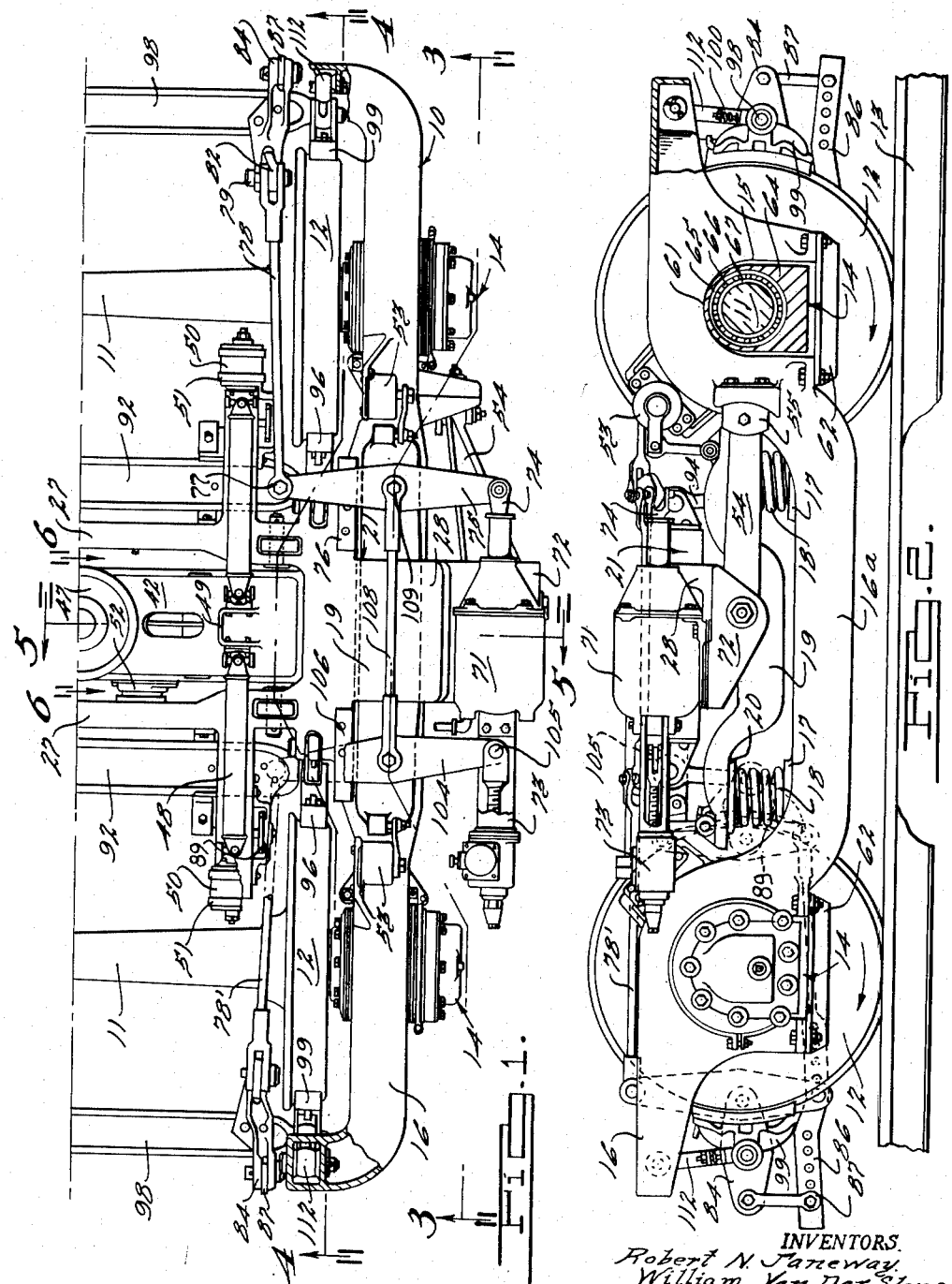

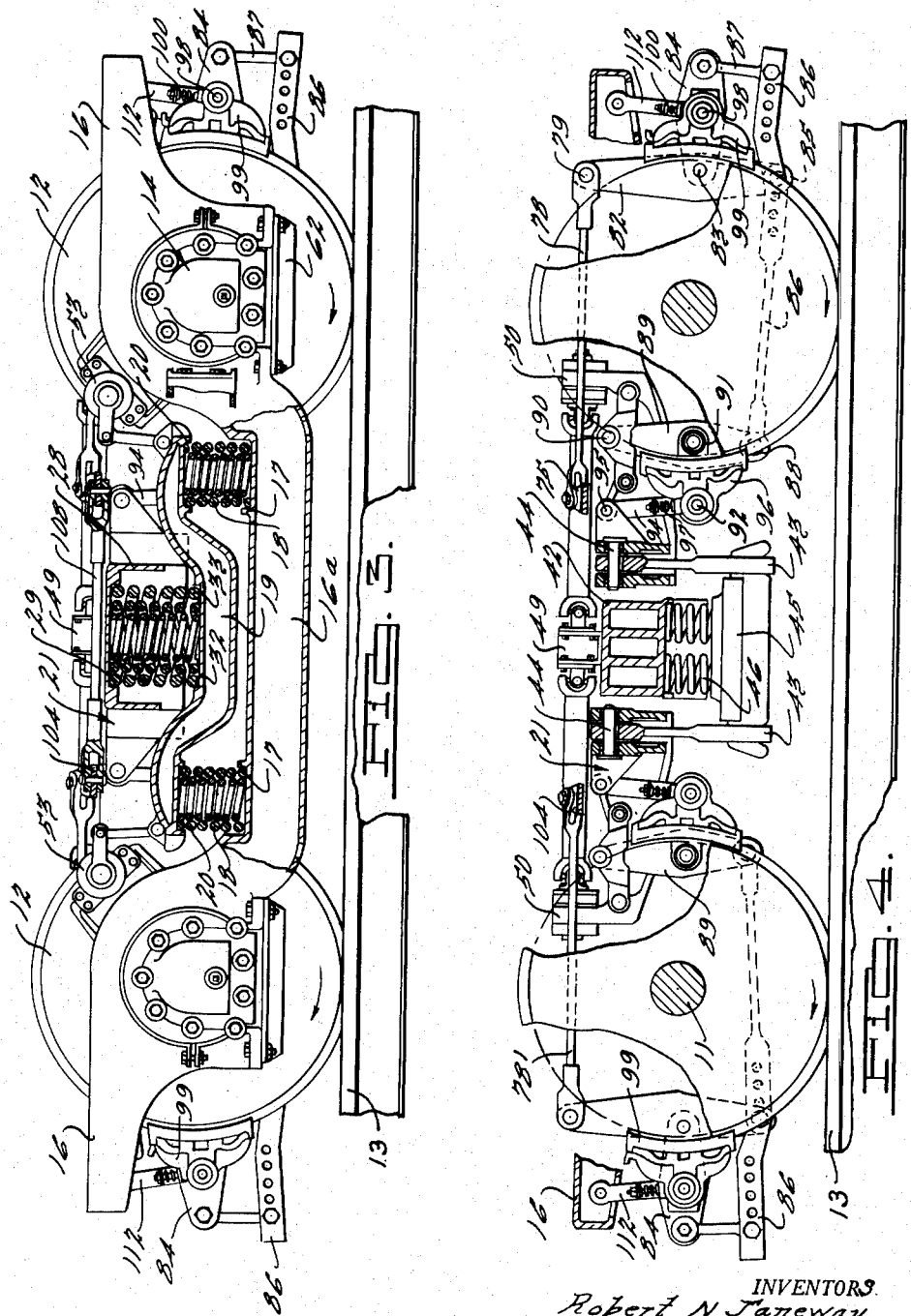

Patented Jan. 12, 1954

2,665,776

UNITED STATES PATENT OFFICE 2,665,776

BRAKE RIGGING SUSPENSION

Robert N. Janeway and William Van Der Sluys, Detroit, Mich., assignors to Chrysler Corporation, Highland Park, Mich., a corporation of Delaware Application November 13, 1948, Serial No. 59,864

3 Claims. (Cl. 188—56)

This invention relates to railway car trucks and has particular reference to an improved arrangement for mounting clasp type brake rigging on the truck unit such that the riding qualities of the truck are improved during application of the brakes.

While the brake rigging arrangement herein disclosed is primarily intended for a pedestalless type of railway truck wherein the side frames are rigidly supported on the wheel axle assemblies, still, the principles of this invention may also be applied to other types of railway trucks. In the past it has been common practice to support the entire brake rigging for passenger type trucks on certain of the sprung frame members, usually the sprung transom frame. Such an arrangement provides a resilient support for the brake rigging when the brakes are released, but, upon application of the brakes, the brake shoes are liable to be wedgingly forced against the truck wheels in such a manner that the sprung frame member supporting the brake rigging is moved to either a raised, a lowered, or a longitudinally or transversely tilted position with respect to the wheel centers which movement is opposed by the restoring force of the frame supporting springs. This movement of the sprung frame during braking results from the brake hangers transmitting to the sprung frame the vertical components of the wedging forces resulting from the brake reaction between the brake shoes and the truck wheels. The forces applied to a sprung brake rigging supporting frame, during application of the brakes, are shown in the diagrammatic sketch represented by Fig. 7 of the drawings. In this sketch F denotes the sprung brake rigging supporting frame to which the brake hangers H are connected. Hangers H support the clasp type brake shoes S which are adapted to be pressed into braking engagement with the rolling surfaces of the wheel W when the braking forces P are applied to the shoes S through the brake shoe actuating linkage (not shown). R represents the wheel reaction that is applied to the shoes S during braking and $R_v$ the vertical component of the reaction R, which component is transmitted by each brake hanger H to the sprung supporting frame F. Before proceeding further with an explanation of this sketch certain facts regarding the force diagram herein shown should be set forth. It can be proved mathematically that:

1. During braking brake shoe friction T along the faces of shoes S will apply only torque or turning moments $T_vL$ to the frame F to which both hangers H are attached, and these turning moments $T_vL$ can be neglected when considering the net vertical forces acting on frame F.

2. The vertical force at each hanger H, neglecting T, is the vertical component $R_v$ of the wheel reaction R, and this vertical component is substantially proportional to the externally applied force P and the distance Y of the brake shoe above or below the wheel centerline O.

3. With both hangers H attached to the frame F which is supported by a spring suspension with a spring rate equivalent to a ten inch static deflection under the load, and with the brake shoes S in a conventional position of 1¾ inches below the wheel centerline O, normal 150% braking would be sufficient to pull the springs of the suspension down solid and completely eliminate all jounce space.

4. Even with the brake shoes S initially centered but with other conditions as stated above, commonly used 250% braking would completely eliminate any spring restoring force at any displacement of the brake shoes above or below the wheel centerline O.

It is thought to be obvious from this diagrammatic sketch and the statements set forth regarding this sketch, that as long as the shoes S are aligned with the wheel centers O, then the vertical components $R_v$ of the wheel reaction R are zero and braking will not produce vertical displacement of the spring supporting frame F. However, as the brake shoes S are seldom aligned with the wheel centers O and as they are continually displaced vertically due to road shock and variations in the car load, it is obvious that the vertically directed force components $R_v$, applied to the sprung frame F during braking, materially influence the movement of the frame F and may have a detrimental effect on the riding qualities of the truck during braking. Under certain conditions these vertically directed wedging forces applied to the sprung transom frame during brake application may be sufficient to so compress or extend the frame supporting spring elements that the springing effect of the frame supporting springs is completely destroyed. This interference with the supporting power and restoring force of the frame supporting springs, when the brakes are applied, is substantially eliminated by splitting the support for the brake hangers between sprung and unsprung frame members as hereinafter disclosed.

Upon application of the brakes, turning moments $T_vL$ about the wheel axle centers O are created at each wheel due to the tangentially directed frictional forces T along the faces of the shoes. The forces T, created at the shoes on opposite sides of each wheel, each have vertical components $T_v$ equal in magnitude but opposite in direction. Each of the vertical components $T_v$ combines with its oppositely directed companion force $T_v$ to produce a turning moment $T_vL$ which moment has a moment arm L equal to the longitudinal spacing of the brake hangers H. These moments are also transmitted by the brake hangers H to the supporting frame F. These moments tend to cause a diving action between the sprung brake rigging supporting frame and the rigidly mounted side frame members. This diving tendency, which is resisted by the car body weight resting on the truck centerplate, may be great enough to exceed the ability of the centerplate to withstand such action in which event undesired movement of the brake rigging supporting frame results.

It is a primary object of this invention to improve the riding qualities of a pedestalless type truck by splitting the support for the brake rigging between sprung and unsprung frame members so that application of the brakes will not materially interfere with the normal movements of the sprung frame members It is an additional object of this invention to provide a brake rigging arrangement that will materially reduce the magnitude of the turning moments transmitted to the sprung portion of the truck on application of the brakes, and to thereby eliminate any possibility of a diving action developing between the sprung brake rigging supporting frame and the rigidly mounted side frames.

It is a further object of this invention to provide a method of attaching the brake rigging to the structural members of the truck that is simple, durable, efficient and one that prevents material interference with the normal movements of the spring supported frame elements associated with the truck frame.

The nature of this invention as well as additional objects and advantages thereof will become fully apparent from a reading of the following description and a consideration of the related drawings wherein:

Fig. 1 is a half plan view of a railway truck embodying this invention

Fig. 2 is a side elevation of the railway truck shown in Fig. 1 with portions of the truck frame broken away to clearly disclose one of the wheel axle bearing assemblies and the brake hanger supporting structure;

Fig. 3 is a vertical sectional view taken along the lines 3—3 of Fig. 1;

Fig. 4 is a sectional elevation taken along the lines 4—4 of Fig. 1 clearly disclosing the brake rigging supporting means;

Fig. 5 is a sectional elevation along the line 5—5 of Fig. 1;

Fig. 6 is a fragmentaary sectional elevation taken along the line 6—6 of Fig. 1; and Fig. 7 is a diagrammatic view that shows the forces created at each wheel when the brakes are applied.

The railway car truck 10 comprises longitudinally extending, transversely spaced, side frame members 16 mounted on a pair of longitudinally spaced, transversely extending, axles 11. Each axle 11 carries a pair of wheels 12 which engage the conventional track rails 13. The protruding ends of each axle 11 are journaled in wheel axle bearing assemblies 14 one of which is clearly shown in Fig. 2 and is subsequently described in detail. The bearing assemblies 14 are mounted in the inverted U-shaped journal openings 15 (see Fig. 2) in the ends of the side frame members 16. The mounting of the bearing assemblies 14 in the side frame journal openings 15 is such as to provide an unsprung, "pedestalless" type of connection wherein the axles and bearing assemblies are connected to the side frame members in such a manner as to preclude relative vertical movement between the axles and the side frame members. Any type of solid bearing connection may be used between the wheel axles and the side frames without affecting the functioning of this brake beam suspension. The wheel axle bearing assembly herein disclosed is similar to that shown in the U. S. patent to Janeway and Miers, No. 2,335,120.

Each of the side frames 16 has a depressed middle section 16a provided with longitudinally spaced seats 17 on which are mounted nested relatively stiff coil springs 18 through which the truck load is resiliently applied to the side frame members. The springs 18 in turn support the end portions of the longitudinally extending beam members 19 which also form a part of the load supporting system. Beams 19 include the spring seats 20 to receive the upper ends of the coil springs 18. Beams 19 are arranged so as to support another load carrying structure, namely, the transom frame 21. This transom frame 21 comprises longitudinally spaced members 27 extending transversely of the truck, which members 27 are joined at their ends by connecting sections 28 which overlie the central portions of the beams 19. The connecting sections 28 are formed with spring receiving seats 29 which are vertically aligned with the complementary seats 32 on the beams 19, the aligned seats 29, 32 receiving the relatively soft transom frame supporting springs 33.

Transom frame 21 supports the truck bolster member 42 by means of swing hanger assemblies 43 (see Figs. 4 and 5) which assemblies permit limited transverse swinging movement of the truck bolster relative to the transom frame. Swing hanger assemblies 43 are pivotally connected to the transom frame 21 by the swing hanger pins 44. Hanger assemblies 43 support the plank member 45 which is formed at its center portion with a longitudinally extending bearing 45a that receives the mating bolster journal 42a. Bearing 45a rockably supports the bolster 42 in such a manner that the bolster may rock transversely of the truck but is prevented from rocking in a longitudinally extending plane. Adjacent each outer end of plank 45 there are mounted spring units 46 that resiliently limit the transverse rocking of the bolster 42 relative to the plank member 45.

Thrust links 48, having their inner ends secured to a bracket 49 carried by the bolster 42 and their outer ends anchored to brackets 50 carried by the transom frame 21, restrict longitudinal movement of the bolster relative to the transom frame. Universal joints connect the thrust links 48 to their supporting brackets 49 and 50. Each link 48 includes a resilient draft member 51 which takes up the longitudinal thrust between the bolster 42 and the transom frame 21 and permits transverse movement of the bolster relative to the transom frame. Shock absorber units 52 restrain relative transverse or lateral movement between the bolster and transom frame.

Relative vertical movement between the side frame members 16 and the beam members 19 is controlled by the shock absorber units 53 mounted therebetween. Along the outboard side of each side frame 16 there is positioned a longitudinally extending stabilizing member 54, having one of its ends pivotally connected to a bracket 72 carried by the transom frame 21 and its other end pivotally connected to a bracket 55 carried by the side frame 16 to restrain relative longitudinal and transverse movement between the side frame members and the transom frame.

The central portion of the truck bolster 42 is formed with a conventional centerplate 47 which receives a mating bearing member carried by the bolster of the car body unit to be mounted on the truck unit. The bearing connections between the body unit and the truck bolsters permit relative turning movement about a vertical axis between the car body unit and the supporting truck units but prevent relative motion between these units about any other axis.

It is now thought to be obvious how the load of the car body unit and its contents is transferred to the truck bolster 42 and then through the swing hanger assemblies 43 to the transom frame 21. The transom frame 21 rests upon the springs 33 which are in turn supported on the beams 19. Beams 19 transmit the car load to the side frame members 16 through the springs 18. The side frame members 16 are rigidly supported at each end on the wheel axle bearing assemblies 14 which are mounted on the ends of the axles 11.

The manner of solidly mounting the side frames 16 on the axle supported wheel bearing assemblies 14, is shown in Fig. 2. Each side frame end portion is provided with a U-shaped journal opening 15 to receive a wheel axle bearing assembly 14. Each journal opening 15 is formed with a bearing seat 61 in the curved bight portion of its U-shaped wall. The seat portion 61 receives the rigid bearing assembly 14 carried by the wheel axle 11. Tie members 62 extend across the open mouth of the U-shaped opening 15 to retain the bearing assembly 14 within the opening 15. Each journal bearing assembly 14 comprises an outer housing 64 within which are concentrically mounted an outer roller bearing race 65, a set of tapered roller bearings 66, and an inner roller bearing race 67, the latter being secured to and rotatable with the wheel axle 11. Housing 64 is adapted to contain oil or some other lubricant so that the rollers 66 of the bearing assembly are constantly lubricated.

The wheel brake rigging is best illustrated in Figs. 1 and 4. It comprises an air cylinder 71 disposed on each side of the truck unit, the cylinders 71 being mounted on laterally extending brackets 72 protruding from the transom frame connecting sections 28. Connected to one end of each air cylinder 71 is a longitudinally extending brake rigging slack adjusting mechanism 73. Extending from the opposite end of each air cylinder 71 is a piston actuated connecting rod 74 adapted to operate the brake linkage associated therewith. Pivotally connected to the exposed end of rod 74 is a horizontally disposed, transversely extending, lever 75. Lever 75 is slidably supported adjacent its inner end by the bearing block 76 carried by the transom 21. The inwardly disposed end of lever 75 is pivotally connected at 77 to the longitudinally extending, connecting rod 78. Rod 78 is pivotally connected at 79 to the vertically disposed lever 82. Lever 82 is pivotally connected intermediate its ends, as at 83, to the inwardly disposed end of the longitudinally extending, bracket member 84. Bracket 84 is rigidly mounted on the side frame supported, transversely extending, brake beam 98. The outboard brake beam 98 is suspended from the rigidly supported side frame 16 by the pivotally mounted, rigid, hanger links 112. Brake beam 98 carries on its outer end portions the brake shoes 99 which are adapted to be rocked into braking engagement with the rolling surfaces of the adjacent truck wheels. Shoes 99 are pivotally mounted on the ends of the brake beam 98 so as to permit relative rotatable movement of the shoes in vertically extending planes. However, the freedom of rotation of the shoes 99 relative to the beam 98 is restrained by spring-loaded bearing members 100 which tend to retain the shoes in fixed positions relative to the beam 98. Bearing members 100 tend to prevent the shoes from dragging on the wheels when the brakes are released and this eliminates wear and chatter of the shoes when they are riding free. The lever 82 is pivotally connected at 85 to an intermediate portion of the compensating and actuating link 86. The outer end of link 86 is connected by the pivoted link 87 to the outer end of the brake beam supported bracket 84. The connections between the levers 82, brackets 84 and links 86 and 87 permit relative pivotal movement between these members and constitute parallelogram linkages for supporting the weight of levers 82 on hangers 112 and for controlling the movement of the outer brake beam 98. A plurality of pin holes are located along the length of link 86 to permit adjustment of the brake linkage to compensate for wear, inaccuracies in manufacture, and the like. The inner end of actuating link 86 is pivotally connected at 88 to a vertically disposed lever 89 that is pivotally connected at 90 to the spring supported transom frame 21. A horizontally disposed, longitudinally extending, bracket-like projection 91, rigidly mounted on the transversely extending inner brake beam 92, is pivotally connected to the intermediate portion of the depending brake linkage lever 89. Inner brake beam hanger link 94 which is pivotally connected at 95 to the spring supported transom frame 21, has its lower end pivotally connected to an outer end portion of the inboard brake beam 92. Brake beam 92 has rotatably mounted on its ends the inner brake shoes 96 which are restrained against free pivotal movement by the spring-loaded bearing members 97 similar to the bearing members 100 associated with the outer brake shoes 99. The spring supported transom frame 21 mounts the depending levers 89 and brake hangers 94 and the brake beam bracket 91 which constitute a parallelogram linkage to control movement of the inner brake shoe 96. The actuating link 86 ties together the linkages for the inner and outer brake shoes so as to bring about substantially simultaneous application of both the inner and outer brake shoes when the brakes are to be applied.

The brake rigging for all wheels of the truck is identical and for that reason the rigging for only one wheel has been described. The brake suspension that has been described will be considered a front wheel suspension for purposes of discussion. To coordinate the rigging on the front and rear wheels along each side of the truck a horizontally disposed, transversely extending rear wheel brake lever 104, similar in design to lever 75 associated with the front wheel brakes, is pivotally connected to an adjustably mounted pivot pin 105 carried by the brake rigging slack adjusting mechanism 73. The inwardly disposed end portion of lever 104 is pivotally connected to a connecting rod 78' for the brake linkage associated with the rear wheel brakes. Lever 104 is slidably supported on a bearing block 106 carried by the transom frame 21, the block 106 being similar to the bearing block 76 for the lever 75 associated with the front wheel brakes. The intermediate portions of levers 75 and 104 are connected together by a longitudinally extending equalizing link 100 that coordinates the action of the front and rear wheel braking mechanisms.

In the conventional pedestal type truck it has been common practice to suspend both the inboard and outboard brake rigging for each wheel from a sprung frame member such as the transom frame 21. In such a truck the spring supporting elements for the transom frame are relatively stiff and, furthermore, they are relatively widely spaced apart longitudinally of the truck. These relatively stiff transom frame supporting springs in a pedestal type truck can effectively resist the thrusts produced by the vertical components $R_v$ of the brake reaction transmitted from the brake shoes to the brake hangers during application of the brakes and therefore the springing effect in such a truck is not materially affected by application of the brakes. Also, due to the supporting springs in a pedestal type truck being relatively widely spaced apart longitudinally of the truck, these springs are able to effectively resist any diving tendencies of the transom frame caused by transmission of the turning couples $T_vL$ to the transom frame during application of the brakes. In contrast, however, a pedestalless type truck similar to that herein disclosed has relatively soft transom frame supporting springs 33 and the transom frame is directly supported on these soft springs which are located at the longitudinal center of the truck. Accordingly, these soft, centrally located, springs 33 may be materially deformed by the brake reaction forces and they offer practically no resistance to the turning couples $T_vL$ created at the wheels during brake application. As a result, these couples $T_vL$ tend to produce a diving of the transom frame in pedestalless type truck during brake application.

It is thought to be obvious from Fig. 7 how application of the wheel brakes on a pedestalless type truck may apply vertically extending forces to the brake hangers that cause the sprung transom frame to be wedgingly urged to or held in a raised, lowered or transversely or longitudinally tilted position whereby the transom frame is forced against some rigid truck member and the springing effect of the transom frame thereby destroyed. At the same time the riding qualities of the truck are materially impaired.

By splitting the support for the wheel brake rigging between the sprung transom frame and the rigidly mounted side frames a construction has been provided whereby only one-half as many brake hangers are connected to the sprung transom frame so that approximately only one-half as much thrust reaction is applied to the sprung transom frame during application of the brakes. Accordingly, the deformation of the transom frame supporting spring elements, during application of the brakes, is materially reduced in magnitude as are the turning moments tending to cause a diving of the transom frame relative to the side frames.

In pedestalless type truck constructions wherein the brake rigging is completely supported by the sprung transom frame, it is obvious that at the same time the transom frame is being held in a raised, lowered, or tilted position due to the reactionary thrust of the brake hangers, the engaged brake shoes at each wheel are also creating turning moments which are transmitted through the brake rigging to the transom frame. These turning moments tend to cause a dive of the transom frame relative to the side frames. Under certain conditions it might be possible for these turning moments to be of sufficient magnitude to cause the sprung brake rigging supporting frame to shift relative to the car body and this shift would tend to rock the truck bolster centerplate 47 relative to the car body bearing member (not shown) and cause increased wear between these engaged bearing members. Under extreme conditions this rocking between the centerplate bearing members might cause disengagement of these bearing members and produce an extremely dangerous situation.

By splitting the support for the brake rigging for each wheel between the sprung frame member, such as a transom frame 21, and a rigidly mounted frame member, such as the side frame 16, a rigging arrangement is provided which tends to materially reduce the vertical displacement of the transom frame and this prevents material interference with the supporting and restoring force of the truck spring elements 53, 18. By splitting of the support for the brake rigging between the sprung and unsprung frame members the turning moments applied to the sprung frame member by each wheel are materially reduced in magnitude so that the diving tendency of the sprung frame member becomes inconsequential.

Thus, it will be seen that the construction herein disclosed improves the riding qualities of the truck during braking for it reduces the vertical displacement as well as the diving tendencies of the sprung transom frame. The vertical components of the thrust reaction applied to the sprung transom frame on brake application are materially reduced due to the fact that only one half of the brake hanger units are connected to the sprung frame member while the other half are rigidly anchored to a solidly supported side frame member. As only the inner brake hangers are connected to the sprung frame member the total turning moment transmitted to the sprung frame member during application of the brakes is greatly reduced in magnitude and consequently the diving tendency of the sprung frame member relative to the side frame is relatively small and can be effectively counteracted by the weight of the car body applied to the transom frame through the bolster centerplate 47, the plank member 45 and the swing hangers 43.

The improved riding qualities of the pedestalless type of truck which uses relatively soft transome frame supporting springs is dependent to a great extent on the novel brake rigging mounting herein disclosed which prevents material interference with the normal movements of the sprung transom frame during application of the brakes.

We claim:
1. In a pedestalless type railway car truck comprising a pair of transversely spaced, longitudinally extending, side frames each having a pair of transversely extending, axle receiving openings therein, said openings having wheel axle bearing units mounted therein, one opening being located adjacent each end of each side frame, axles extending between and supporting the bearings at corresponding ends of the side frames so as to provide a solid mounting of the side frames on the axles, wheel mounted on each end of each axle, relatively stiff resilient members mounted on each side frame adjacent each end axle receiving opening, a relatively soft resilient member supported by each pair of relatively stiff resilient members and located at a point substantially midway between said relatively stiff resilient members, a frame member extending between and floatingly mounted on said relatively soft resilient members and being free of association with the wheel axles and side frames except through the relatively soft frame supporting resilient elements, and clasp type brake shoes positioned adjacent each side of each wheel adapted to be clampingly engaged with the rolling surface thereof, the brake shoe on one side of each wheel being suspended by a pivotally mounted rigid link from said frame member and the brake shoe on the opposite side of each wheel being suspended by a pivotally mounted rigid link from one of said side frames.

2. In a pedestalless type railway car truck comprising a pair of transversely spaced, longitudinally extending, side frames each having a pair of transversely extending, axle receiving openings therein adjacent opposite ends thereof, said openings having wheel axle bearing units mounted therein, axles extending between and supporting the bearings and side frames at corresponding ends of the side frames so as to provide a solid mounting of the side frames on the axles, wheels mounted on each end of each axle, relatively stiff resilient members mounted on each side frame adjacent the openings at each end thereof, a relatively soft resilient member supported by each pair of relatively stiff resilient members and located at a point substantially midway between said relatively stiff resilient members, a frame member extending between and floatingly mounted on said relatively soft resilient members and free of any connection to the axles and side frames except through said relatively soft resilient members, and clasp type brake shoes positioned adjacent each side of each wheel adapted to be clampingly engaged with the rolling surface thereof, the brake shoe on the inboard side of each wheel being suspended by a pivotally mounted rigid link from said frame member and the brake shoe on the outboard side of each wheel being suspended by a pivotally mounted rigid link from one of said side frames, the suspension of the brake shoes being such that the brake reaction on brake application is split between the solidly supported side frames and the resiliently supported frame member.

3. In a pedestalless type railway car truck, a pair of transversely spaced, longitudinally extending, side frames each having a transversely extending, wheel axle receiving opening adjacent each end thereof, a bearing mounted in each opening, axles journalled in and extending between the bearings at corresponding ends of said side frames, wheels mounted on each end of the axles, relatively stiff resilient members mounted on each side frame adjacent the opening at each end thereof, a rigid beam member mounted on and extending between the relatively stiff resilient members on each side frame, a relatively soft resilient member supported by each of said beam members and located at a point substantially midway between the supporting relatively stiff resilient members, and a transom frame extending between and floatingly mounted on said relatively soft, medially located, resilient means, said transom frame having no direct connection with said side frames and wheel axles, a pair of friction type brake shoes mounted adjacent opposite sides of each wheel, the friction type brake shoes on one side of each wheel being supported by a rigid brake hanger pivotally mounted on said transom frame and the friction type brake shoe on the opposite side of each wheel being supported by a rigid brake hanger pivotally mounted on one of said side frames.

ROBERT N. JANEWAY.
WILLIAM VAN DER SLUYS.

References Cited in the file of this patent

UNITED STATES PATENTS

| Number | Name | Date |
|---|---|---|
| 2,327,157 | Tack | Aug. 17, 1943 |
| 2,331,174 | Carpenter | Oct. 5, 1943 |
| 2,343,941 | Tack | Mar. 14, 1944 |
| 2,498,745 | Van Der Sluys | Feb. 28, 1950 |